United States Patent
Maksimovic et al.

(10) Patent No.: US 12,498,621 B2
(45) Date of Patent: Dec. 16, 2025

(54) MINIATURIZED ADAPTIVE OPTICS WITH DEFORMABLE PHASE PLATE FOR DIGITAL TILT AND ABERRATION CORRECTION

(71) Applicant: Apple Inc., Cupertino, CA (US)

(72) Inventors: Milan Maksimovic, Sunnyvale, CA (US); Arnaud Pouydebasque, Varces-Allières-et-Risset (FR); Marjorie Trzmiel, Grenoble (FR); Miodrag Scepanovic, San Jose, CA (US); Nachiappan Chidambaram, Fontanil Cornillon (FR); Sebastien Bolis, Crolles (FR)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 18/370,367

(22) Filed: Sep. 19, 2023

(65) Prior Publication Data
US 2024/0094607 A1   Mar. 21, 2024

Related U.S. Application Data

(60) Provisional application No. 63/408,436, filed on Sep. 20, 2022.

(51) Int. Cl.
  *G03B 13/36* (2021.01)
  *G03B 5/02* (2021.01)
  *H04N 23/68* (2023.01)

(52) U.S. Cl.
  CPC ............ *G03B 13/36* (2013.01); *G03B 5/02* (2013.01); *H04N 23/6815* (2023.01); *G03B 2205/0061* (2013.01)

(58) Field of Classification Search
  CPC .. G03B 13/36; G03B 5/02; G03B 2205/0061; H04N 23/6815; H04N 23/617; H04N 23/81
  See application file for complete search history.

(56) References Cited

U.S. PATENT DOCUMENTS

| 9,250,367 B2 * | 2/2016 | Costache | ............. G02B 26/004 |
| 2011/0032624 A1 * | 2/2011 | Bolis | .................. G02B 26/0825 359/666 |

(Continued)

FOREIGN PATENT DOCUMENTS

EP   3929648 A1 *   12/2021   ........... G02B 21/361

OTHER PUBLICATIONS

Banerjee et al., "Optofluidic adaptive optics," Applied Optics, Jul. 24, 2018, 57(22):6338-6344.

(Continued)

*Primary Examiner* — Shahbaz Nazrul
(74) *Attorney, Agent, or Firm* — Fish & Richardson P.C.

(57) ABSTRACT

In some embodiments, the camera system comprises: an optical assembly to create an optical image from the optical wavefront; a deformable phase plate (DPP) to receive the optical image from the optical assembly and to adjust the optical image in accordance with a control signal, the DPP including a deformable surface suspended over a cavity filled with optical fluid, and electrical actuation elements configured to change a shape of the deformable surface based on the control signal, the electrical actuation elements arranged in a pattern in the cavity and, when activated, provide an electrostatic force on the deformable surface; an image sensor to convert the adjusted optical image into electrical signals; an image signal processor to generate a digital image from the electrical signals; and an estimator to estimate an aberration or tilt correction of the digital image and to generate the control signal based on the estimated aberration or tilt correction.

22 Claims, 9 Drawing Sheets

(56) References Cited

U.S. PATENT DOCUMENTS

2013/0329094 A1* 12/2013 Ranalli ............... G06T 5/73
　　　　　　　　　　　　　　　　　　　　　348/241
2017/0302498 A1* 10/2017 Tanabe ............... H04L 27/389

OTHER PUBLICATIONS

El-Kashef et al., "Thermo-Optical Parameters of Propylene Carbonate as a Laser Dye Solvent," Optics, Nov. 13, 2013, 2(5):61-66.

Rajaeipour et al., "Cascading optofluidic phase modulators for performance enhancement in refractive adaptive optics," Advanced Photonics, Nov. 18, 2020, 2(6):066005, pp. 1-10.

Rajaeipour et al., "Seventh-order wavefront modulation with a gravity-neutral optofluidic deformable phase plate," Journal of Optical Microsystems, Aug. 5, 2021, 1(3):034502, pp. 1-16.

Tang et al., "Laser Ablation of Metal Substrates for Superhydrophobic Effect," JLMN—Journal of Laser Micro/Nanoengineering, Mar. 1, 2011, 6(1):6-9.

Tian et al., "DNN-based aberration correction in a wavefront sensorless adaptive optics system," Optics Express, Apr. 15, 2019, 27(8):10765-10776.

Yue et al., "Wavefront sensorless adaptive optics system for extended objects based on linear phase diversity technique," Optics Communications, Nov. 15, 2020, 475:126209, pp. 1-9.

\* cited by examiner

MINIATURIZED ADAPTIVE OPTICS WITH DEFORMABLE PHASE PLATE FOR DIGITAL TILT AND ABERRATION CORRECTION

CROSS-REFERENCE TO RELATED APPLICATION

This application claims priority to U.S. Provisional Patent Application No. 63/408,436, filed Sep. 20, 2022, the entire contents of which are incorporated herein by reference.

TECHNICAL FIELD

This disclosure relates generally to adaptive optics (AO) technology for miniature wide angle cameras.

BACKGROUND

Next generation wide angle camera systems for mobile devices (e.g., smart phones, tablet computers) will have higher resolution image sensors with smaller pixels than the current generation of camera systems. Due to the higher resolution and smaller pixel size, these next generation camera systems will be affected by image plane tilt and other image artifacts, which will limit the resolving power of the camera system. Additionally, the impact of optical aberrations will be greater for the next generation camera systems.

SUMMARY

Embodiments are disclosed for a camera system that includes miniaturized adaptive optics (AO) that use a deformable phase plate (DPP) for digital tilt and aberration correction.

In some embodiments, a camera system comprises: an optical assembly to receive an optical wavefront and to create an optical image from the optical wavefront; at least one deformable phase plate (DPP) to receive the optical image from the optical assembly and to adjust the optical image in accordance with at least one control signal, the at least one DPP including a deformable surface suspended over a cavity filled with optical fluid, and electrical actuation elements configured to change a shape of the deformable surface based on the at least one control signal, the electrical actuation elements arranged in a pattern in the cavity and, when activated, providing an electrostatic force on the deformable surface; an image sensor to convert the adjusted optical image into electrical signals; an image signal processor to generate a digital image from the electrical signals; and an estimator to estimate an aberration or tilt correction of the digital image and to generate the at least one control signal based on the estimated aberration or tilt correction.

In some embodiments, the electrical actuation elements are arranged in a plurality of stages comprising concentric rings of electrical actuation elements, each ring having a different size and number of electrical actuation elements.

In some embodiments, the electrical actuation elements are located in an aperture area and the aperture area is separated from an edge of the cavity by a gap.

In some embodiments, the DPP includes a transmissive plate attached to the deformable surface, and piezo actuators added to a periphery of the aperture area to control a volume of optical fluid in the cavity thereby causing the deformable surface to tilt.

In some embodiments, the number of electrical actuation elements is 33.

In some embodiments, the at least one DPP is in-line with the image sensor and the deformable surface is transmissive.

In some embodiments, the optical assembly creates a folded optical path and the deformable surface is reflective.

In some embodiments, the aberration or tilt correction of the digital image is estimated by a linearized phase diversity process that uses a plurality of digital images with various focus positions, and the at least one control signal is generated by minimizing at least one image quality metric or cost function.

In some embodiments, the plurality of digital images with various focus positions are obtained from an autofocus mechanism of the camera system with optical image stabilization.

In some embodiment, the aberration or tilt correction of the digital image is estimated using a neural network trained to recognize the aberration or tilt correction from at least one image, and the at least one control signal is generated by the neural network.

In some embodiments, the image sensor has a split-pixel architecture and the aberration or tilt correction of the digital image is estimated using data obtained from the split-pixel architecture.

In some embodiments, the image sensor has a quad-pixel architecture and a sparse subset of image data from the quad-pixel architecture, and information on focus or other dependencies in quad-pixel data, are calibrated against a set of compensating signals on the at least one DPP.

In some embodiments, there are at least two DPPs that are cascaded in an optical path of the camera system.

In some embodiments, the at least one DPP is located in the optical assembly.

In some embodiments, the optical fluid is oil.

In some embodiments, the deformable surface is an elastomer membrane comprising siloxane materials.

In some embodiments, an antireflection coating is added to the deformable surface.

In some embodiments, the electrical actuation elements are actuated by actuation voltages based on influence elements and Zernike coefficients obtained during a calibration process.

In some embodiments, a method comprises: creating, with an optical assembly, an optical image from an optical wavefront; adjusting, in response to at least one control signal, the optical image by deforming a transmissive or reflective surface suspended over a cavity filled with optical fluid using electrical actuation elements that generate an electrostatic force on the deformable surface; converting, with an image sensor, the optical image into electrical signals; generating, with an image signal processor, a digital image from the electrical signals; estimating, with at least one processor, an aberration or tilt correction of the digital image; and generating the at least one control signal based on the estimated aberration or tilt correction.

In some embodiment, estimating the aberration or tilt correction of the digital image further comprises: estimating the aberration or tilt correction with a linearized phase diversity process that uses a plurality of digital images with various focus positions; and generating the at least one control signal by minimizing at least one image quality metric or cost function.

In some embodiments, estimating the aberration or tilt correction of the digital image further comprises: estimating the aberration or tilt correction using a neural network trained to recognize the aberration or tilt correction from at least one image; and generating, by the neural network, the at least one control signal.

In some embodiments, the method further comprises: applying, with piezo actuators, local forces on a transmissive plate coupled to the transmissive or reflective surface to cause the surface to tilt in response to the at least one control signal.

Particular embodiments described herein provide one or more of the following advantages. The disclosed optical architecture is specifically optimized for low power consumption, small form factor image capture systems that can be integrated into more compact next generation mobile devices, such as smartphones, tablet computers, smartwatches and augmented reality (AR) or virtual reality (VR) headsets.

DETAILED DESCRIPTION

The disclosed embodiments include an optical architecture for wavefront correction in a mobile device image capture system with a transmissive (or reflective) adaptive optofluidic element (hereinafter "deformable phase plate (DPP)") having a controllable surface shape suitable for in-line (or folded) optical paths and associated geometry. In some embodiments, the shape of deformable membrane is controlled by electrical actuation elements (e.g., electrodes) to induce deformation to the optical wavefront depending on a locally adjusted optical path. In some embodiments, detection of optical aberrations and/or image tilt is achieved by using a wavefront sensor less (WFS) approach based on image and/or data derived from a split-pixel sensor architecture.

In some embodiments, the deformation of the DPP is controlled by a closed-loop control system that uses several images with various focus positions to estimate relevant aberrations using a linearized phase diversity algorithm. In some embodiments, focused and defocused images are taken using, for example, an autofocus (AF) mechanism with optical image stabilization (OIS), and control signals are calculated by minimizing a specific image quality metric or similar cost function. In other embodiments, images are used to train a neural network to recognize image aberrations and generate control signals directly. In yet other embodiments, a sparse subset of quad-pixel sensor data, such as information on the focus and/or other dependencies, is calibrated against a specific set of compensating signals on the DPP. A precomputed lookup table with control signals for typical quad-pixel sensor data can be used or on-device computation can be performed.

In some embodiments, the DPP is used for digital tilt compensation of an image plane (sensor) tilt in a wide angle image capture device (e.g., a wide angle camera). In some embodiments, a wide angle camera system with large sensors and an AF system may have a tilt of the image plane that deteriorates image quality. This tilt can be compensated and image quality restored by introducing an additional wavefront tilt using a DPP located close to the image sensor. In some embodiments, the architecture can be mechanically compact if the sensor is placed in the existing location of an infrared (IR) cut-off filter and implementing the IR filter directly on the lens element. In some embodiments, a plurality of DPPs can be cascaded in the optical path to provide a larger wavefront control if needed.

Additional aberration sources that significantly deteriorate image quality are sensor warpage causing a curved shape of the image plane and internal tilts and decenters of the lens elements as a consequence of the fabrication and assembly tolerances. In some embodiments, one or more DPPs can be used to correct aberrations from these sources individually or together with tilt correction.

In some embodiments, the DPP can be used within an optical assembly as a means to correct low-order wavefront aberrations including tip/tilt and jitter due to atmospheric turbulence or other environmental influences. For example, the DPP can be used to: 1) correct aberrations and improve image quality for astrophotography (e.g., imaging stars and other celestial objects in low-light conditions and with atmospheric turbulence); 2) correct aberrations and improve image quality for underwater imaging and/or imaging of water surfaces (e.g., index changes in air and water degrade image quality); 3) correct for fluctuations in extreme imaging conditions like high temperature environments, high humidity, fog or smoke; 4) correcting aberrations when imaging in macro photography; and 5) laser beam shaping by using the DPP with other fixed optical elements such as lenses, diffusers, micron arrays, etc., with composition of defocused and astigmatic laser beams.

In some embodiments, an electromechanical architecture for actuation is used that is optimized for low power consumption, has a small form factor suitable for integration into mobile devices (e.g., a smartphone) and supports digital tilt compensation of sensor and/or general optical aberration correction. The architecture has a low actuation voltage (e.g., down to tenths of a volt) by placing electrical actuation elements beneath the membrane (on the cavity side) and using a high permittivity fluid (e.g., oil with high permittivity>=65) in the cavity.

In some embodiments, membrane shape control is improved by a particular configuration and location of the electrical actuation elements, and including a gap between an aperture area full of electrodes and the edge of the cavity. A higher number of electrical actuation elements achieves a finer tilt correction (e.g., 33 electrodes for a $5^{th}$ order Zernike mode correction).

In some embodiments, membrane shape control and actuation voltage are lowered with an elastomer membrane (e.g., siloxane-based materials) with pure elastic behavior and no relaxations or viscosity-elastic behavior. In some embodiments, optical performance (e.g., transmittance) can be improved with an anti-reflective (AR) coating added on the membrane (opposite to the cavity side).

In addition to the electrostatic actuation in the aperture area (for aberration correction), in some embodiments a piezo actuation can be added on the periphery of the aperture area to control the volume of oil in the aperture area (e.g., by pushing more or less oil into the aperture area) for the possible benefits of thermal compensation, improved optical performance stability and improved aberration correction ability for certain configurations.

System Overview

Figure 1:
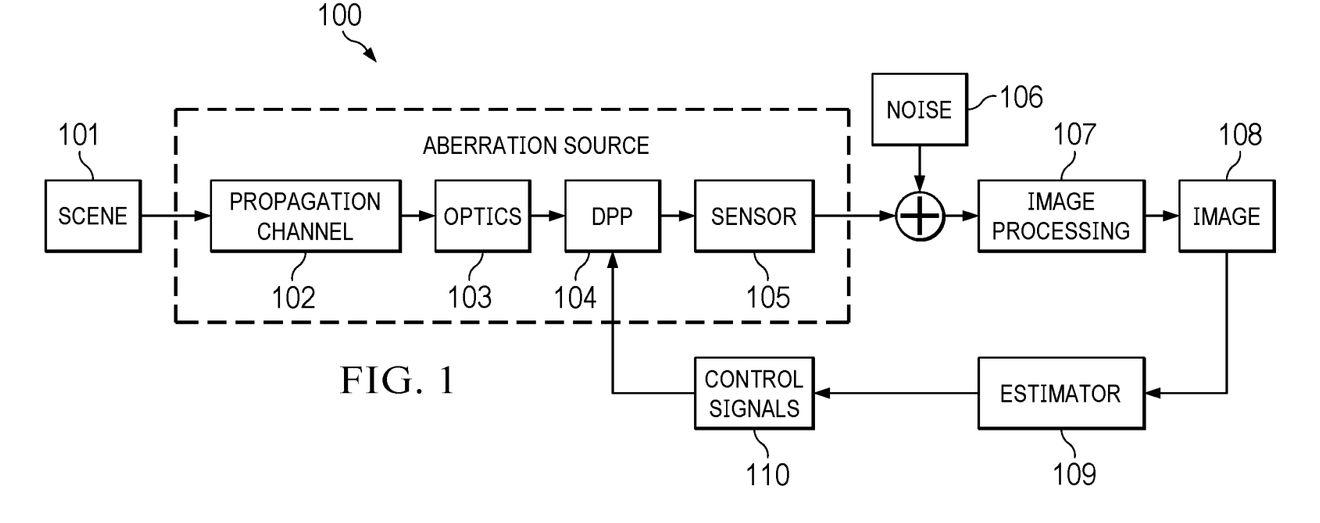
FIG. 1 is a block diagram of an image formation and control model for a camera system that includes a DPP for digital tilt and aberration correction, according to some embodiments.

FIG. 1 is a block diagram of an image formation and control model 100 for a camera system that includes DPP for digital tilt and aberration correction, according to some embodiments. Model 100 includes propagation channel 102, optics 103, DPP 104, image sensor 105, image processing 107, estimator 109 and control signals 110.

Scene 101 is captured in light waves (modeled as a wavefront) that propagates through propagation channel 102 (e.g., the atmosphere) before entering optics 103 (e.g., an optical assembly) of, for example, a wide angle camera. Propagation channel 102 can model turbulence, scattering and absorbing particles that cause an aberration or a wavefront (image) tilt, which affects the sharpness of output image 108 (e.g., a blurry image). In model 100, propagation channel 102, optics 103, DPP 104 and image sensor 105 are collectively an aberration source that induces aberrations and/or wavefront tilt into output image 108.

In some embodiments, DPP 104 is included in the optical path of the camera (comprising optics 103, DPP 104 and image sensor 105) to correct for aberrations and/or wavefront tilt. The example shown is an "in-line" optical path which uses a transmissive DPP 104 that allows light to pass through to image sensor 105. In other embodiments, where the optical path is folded, a reflective DPP can be used to direct the light onto image sensor 105 or onto other optical components in the optical assembly (e.g., lenses, mirrors, polarizers, diffusers, light pipes and waveguides, beam splitters, optical filters, diffraction gratings).

Image sensor 105 (e.g., a semiconductor image sensor) converts light into electrical signals. Some examples of images sensors include a complementary metal oxide semiconductor (CMOS) sensor and a charge coupled device (CDD). Noise 106 is added to the output of image sensor 105 to simulate noise added by image sensor 105. DPP 104 includes a deformable surface (e.g., an elastic polymer membrane) that has a shape controlled by one or more control signals 110 generated by estimator 109. In some embodiments, estimator 109 implements a WFS approach to generate one or more control signals 110 based on images output from image processing pipeline 107, and/or data derived from a split pixel sensor architecture typically included into cameras for AF.

In some embodiments, aberration estimation is implemented using a linear phase diversity process and image quality metrics, as described in Yue, D., & Nie, H. (2020, November). Wavefront sensor less adaptive optics system for extended objects based on linear phase diversity technique. *Optics Communications*, 475, 126209. https://doi.org/10.1016/j.optcom.2020.126209. Some examples of image quality metrics include metrics derived from focus operators, including but not limited to: gradient-based operators, Laplacian-based operators, Wavelet-based operators, statistic-based operators, and DCT-based operators applied to parts of an image or the whole image.

In other embodiments, control signals 110 are generated directly by a deep neural network (DNN) trained on, for example, focused and unfocused images, such as described in Qinghua Tian, Chenda Lu, Bo Liu, Lei Zhu, Xiaolong Pan, Qi Zhang, Leijing Yang, Feng Tian, and Xiangjun Xin, "DNN-based aberration correction in a wavefront sensor less adaptive optics system," Opt. Express 27, 10765-10776 (2019). Other control algorithms can also be used including but not limited to: gradient descent optimization, simplex optimization, genetic algorithms and simulated annealing.

Image processing pipeline 107 can be implemented by an image signal processor (ISP) and performs various operations on the captured image such as demosaicing, denoising, filtering and auto functions (e.g., auto exposure (AE), auto white balance, AF) and gamma transformations and rendering operations.

Figure 2A:
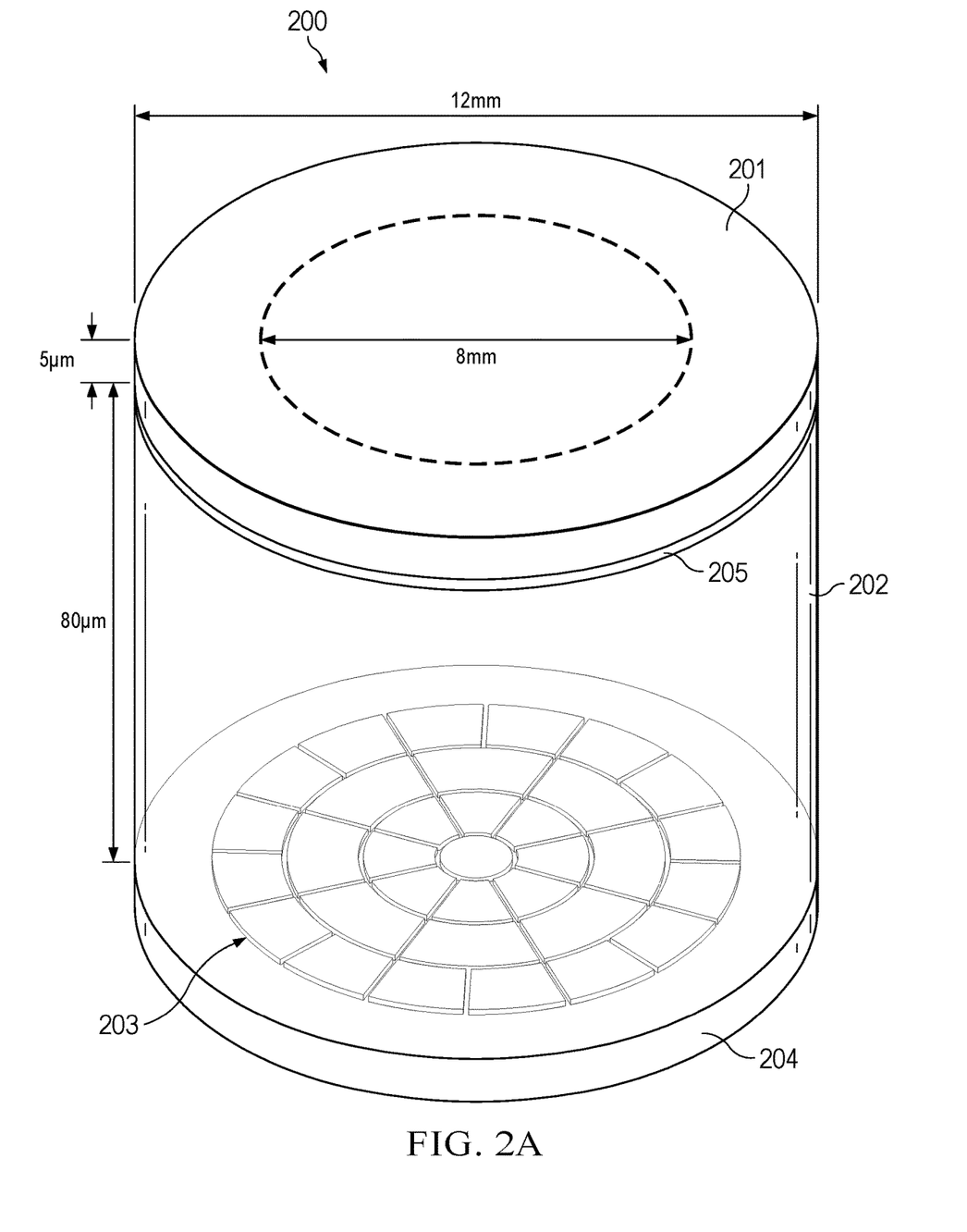
FIG. 2A is a perspective view of the DPP of FIG. 1, according to some embodiments.

FIG. 2A is a perspective view of DPP 200, according to some embodiments. DPP 200 can be used in the optical path of a wide angle camera for digital tilt correction, general aberration correction and laser beam shaping. In some embodiments, DPP 200 includes deformable conductive polymer membrane 201 suspended over cavity 202 filled with optical fluid. The bottom of cavity 202 includes transparent bottom electrical actuation elements 203 (hereinafter "bottom electrodes 203") disposed on substrate 204 (e.g., a glass substrate) and a single transparent top electrical actuation element 205 (hereinafter "top electrode 205") connected to ground and disposed below membrane 201 to avoid low permittivity material on the electrical path (see FIG. 2B).

In some embodiments, cavity 202 also includes fluid ports (not shown) for adding and removing optical fluid and contact pads (not shown) for connecting electrodes 203 to a voltage source. In some embodiments, optical fluid 203 is oil with a permittivity of about 65. In other embodiments, other optical fluids can be used, including but not limited to: n-heptanol (HeHO), isopropyl alcohol (IPA), ethanol (EtOH), Ethylene glycol (EG), Propylene carbonate (PC) and water (H2O).

In some embodiments, to achieve a desirable actuation voltage for electrodes 203 (<<50V), membrane 201 is constructed from a purely elastic soft polymer with a low Young Modules (e.g., <=8 MPa), a low residual/internal stress (<0.2 MPa) and low thickness (e.g., thickness <10 mu).

Figure 2B:
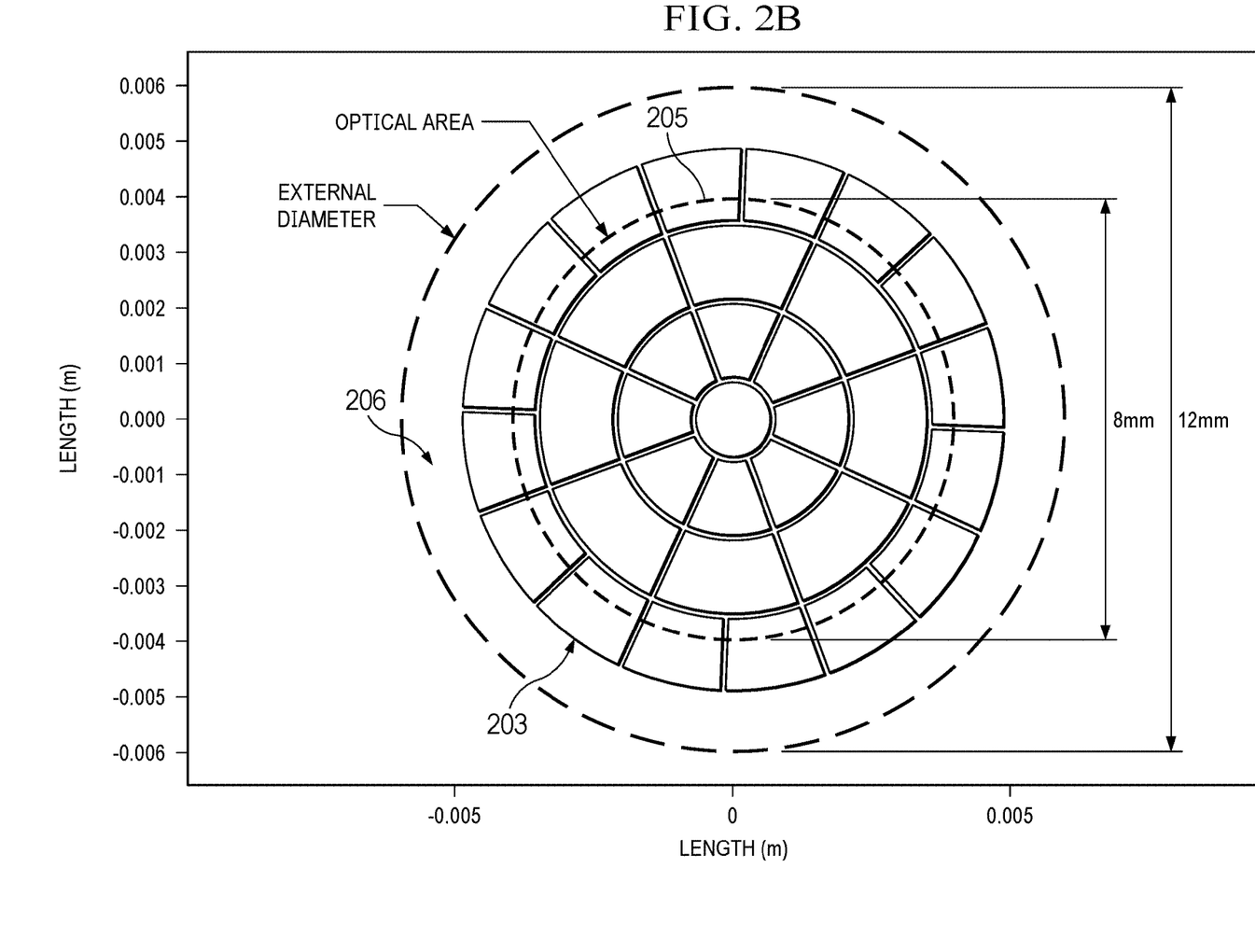
FIG. 2B is a top view of the bottom electrodes of the DPP of FIG. 2A, according to some embodiments.
Figure 2C:
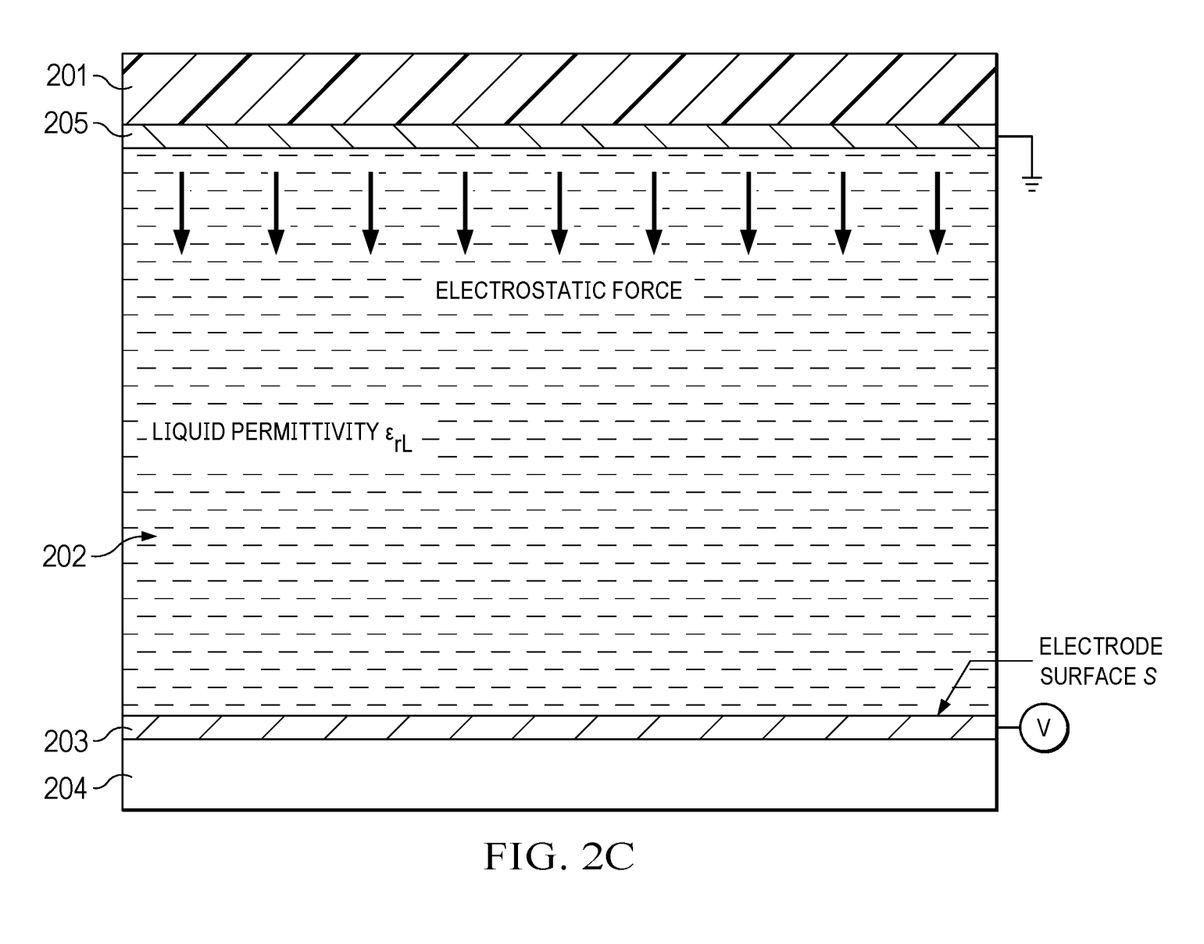
FIG. 2C illustrates an electrostatic force on a deformable membrane of the DPP of FIGS. 2A and 2B, according to some embodiments.

FIG. 2B is a top plan view of the bottom electrodes 203 of the DPP 200 of FIG. 2A, according to some embodiments. In the example shown, the 33 bottom electrodes 203 are distributed over four stages (concentric rings) on substrate 204, and are selectively activated by a voltage source to control the shape of membrane 201 using an electrostatic force between membrane 201 and bottom electrodes 203, as shown in FIG. 2C. In the example shown, cavity 202 has a diameter of about 12 mm, an optical area 207 of about 8 mm, a membrane 201 thickness of about 5 micrometers and a depth (gap g measured between top electrode 205 and bottom electrodes 203) of about 80 mu. The dimensions described above make DPP 200 a mechanically compact design suitable for use in mobile devices with small form factors.

Shape control of membrane 201 is improved by a particular pattern and location of bottom electrodes 203 as shown in FIG. 2B, including a gap 206 between an aperture area (which contains bottom electrodes 203) and the edge of cavity 202. A higher number of bottom electrodes 203 achieves a finer tilt correction (e.g., 33 electrodes for a $5^{th}$ order Zernike mode correction). In the example shown, each ring of bottom electrodes 203 has a different number, size and shape of electrical actuation elements that are optimized for performance.

In some embodiments, membrane shape control and actuation voltage can be lowered by using an elastomer membrane 201 (e.g., siloxane-based materials) with pure elastic behavior and no relaxations or viscosity-elastic behavior. In some embodiments, optical performance (e.g., transmittance) is improved with an anti-reflective (AR) coating added on membrane 201 (opposite to the cavity side).

In addition to the electrostatic actuation in aperture area (for aberration correction), a piezo actuation can be added on the periphery of aperture area to control the volume of oil in aperture area (e.g., by pushing more or less oil into the aperture area through the oil ports) for the possible benefits of thermal compensation and/or improved optical performance stability and improved aberrations correction ability for certain configurations.

Figure 3A:
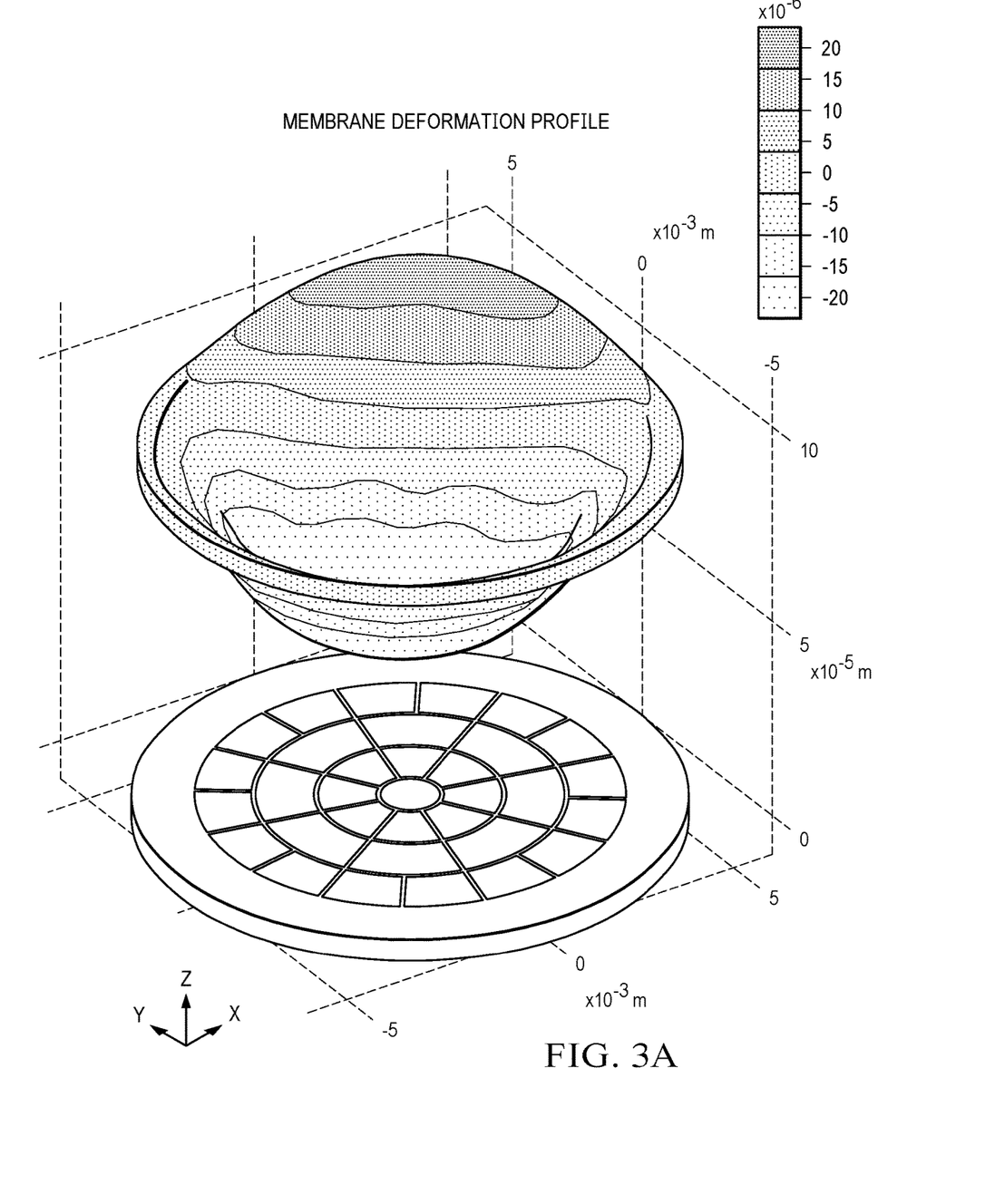
FIG. 3A illustrates a membrane deformation profile for the DPP of FIGS. 2A-2C, according to some embodiments.
Figure 3B:
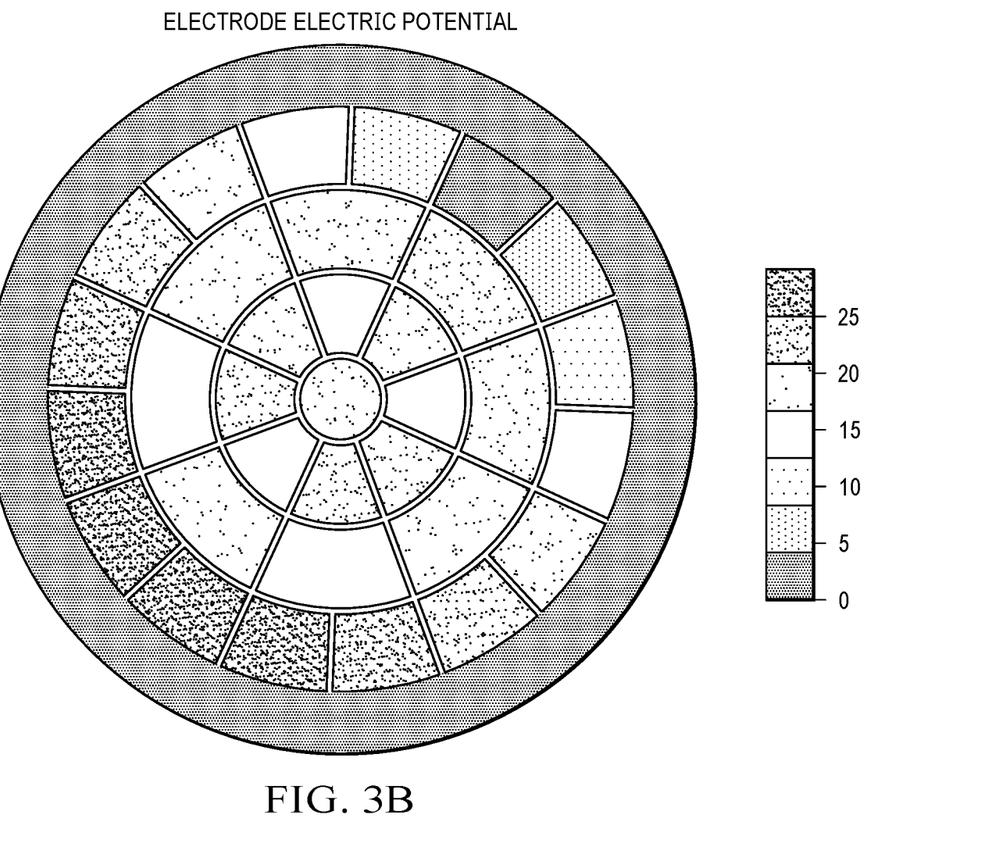
FIG. 3B illustrates an electrode electric potential corresponding to the membrane deformation profile shown in FIG. 3A, according to some embodiments.

FIG. 3A illustrates a membrane deformation profile for DPP 200 and FIG. 3B illustrates an electrode electric potential corresponding to the membrane deformation profile shown in FIG. 3A, according to some embodiments. The relationship between the membrane deformation profile and electrode electric potential can be determined using a linear model of Zernike coefficients versus voltage. This is possible if the desired shape is explicitly known, otherwise a different procedure using optimization and suitable merit function can be used. A function $\psi_k$ describing an arbitrary membrane deformation in polar coordinates can be expanded into a sequence of Zernike polynomials over an entire surface of the aperture area given by [1]:

$$\psi_k(r,\theta) = a_k Z_k(r,\theta) = \Sigma_{l=1}^{N} b^{kl} V_l^2 Z_k(r,\theta), \quad [1]$$

where $a_k$ is the kth Zernike coefficient, $Z_k$ is kth Zernike polynomial, N is the number of electrodes, $b_{kl}$ is an influence parameter, $V_l$ is the voltage from the lth electrode, r is a radial distance of the aperture area and θ is a azimuthal angle measured from the center of the aperture area. The total membrane deformation is equal to the combination of the deformation induced by each electrode given by [2]:

$$\psi_{tot} = \sum_{k=1}^{M} \psi_k = \sum_{k=1}^{M} (\sum_{l=1}^{M} (b_{kl} V_l^2) Z_k, \quad [2]$$

$$\text{where } a_k = \begin{bmatrix} a_1 \\ a_2 \\ \dots \\ a_M \end{bmatrix} = \begin{bmatrix} b_{1k} \\ b_{2k} \\ \dots \\ b_{Nk} \end{bmatrix} \times \begin{bmatrix} V_1^2 \\ V_2^2 \\ \dots \\ V_N^2 \end{bmatrix}. \quad [3]$$

Equation [3] has the form $\vec{a} = B\hat{c}$, where matrix B is an M×N influence matrix that can be determined in a calibration process using a wavefront deformation simulation that simulates different membrane shapes for different sets of actuation voltage values. A vector of Zernike coefficients, $a_k$, can be extracted from the simulated membrane shapes (Zernike targets) for each different set of electrode voltages, and stored in the B matrix with N columns equal to N electrodes and M rows equal to the M Zernike coefficients, where each Zernike coefficient is equal to a linear sum of each electrode influence multiplied by the square of the electrode voltage (force linearization). During operation, the predicted voltage vector $\hat{c}$ is determined by solving $\vec{a} = B\hat{c}$ for $\hat{c}$ using, for example, the method of least squares or other suitable solver, where $\vec{a}$ is the desired Zernike target to correct aberration and/or wavefront tilt and B was determined during the calibration process and stored in memory of the camera (e.g., camera flash memory). Using the above method, a desired membrane shape to correct aberration and/or wavefront tilt can be generated up to a $5^{th}$ order Zernike polynomial. The transfer function (wavefront modulation) of the DPP can be expressed as $$T = Ae^{i\frac{2\pi}{\lambda}\psi_{tot}\cdot(n-1)}, \quad [4]$$

where A is the amplitude modulation (assumed to be equal to 1), n is the refractive index of the DPP and $\psi_{tot}$ is the total membrane deformation.

Figure 4A:
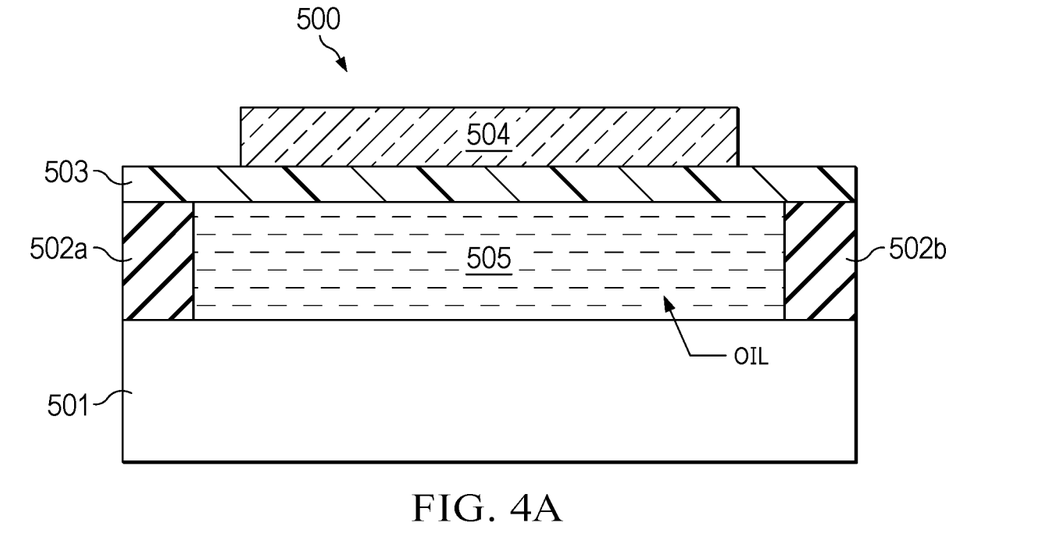
FIG. 4A is a cross-section (A-A) view of a DPP structure for digital tilt correction in a rest position, according to some embodiments.
Figure 4B:
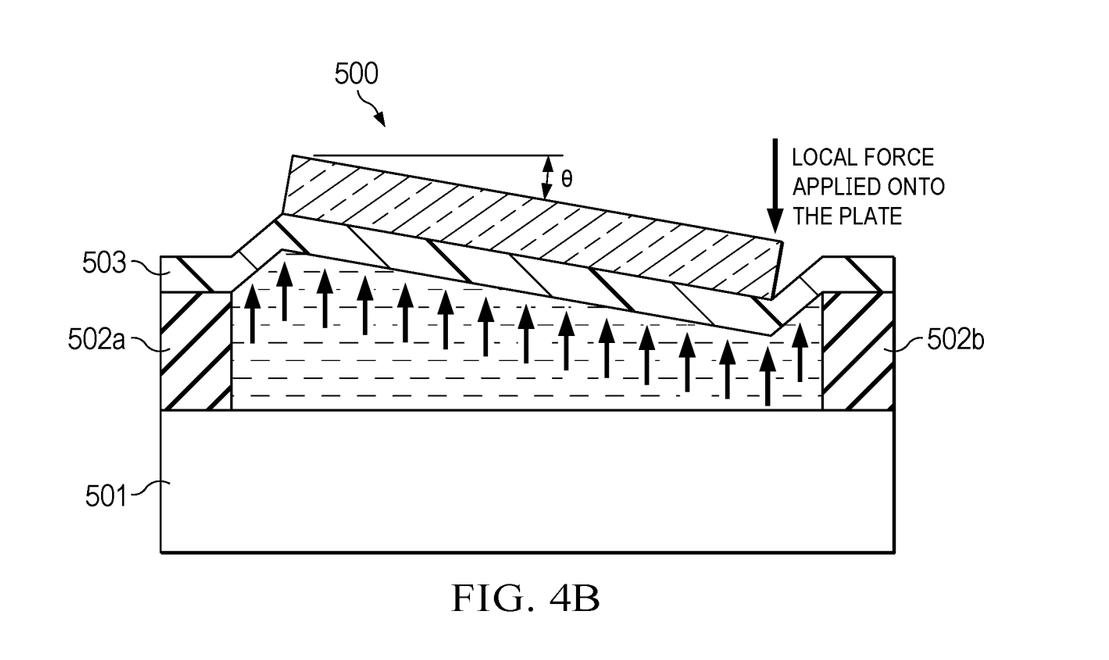
FIG. 4B is a cross-section (A-A) of the DPP structure of FIG. 4A under actuation by local forces applied to corners of the DPP structure, according to some embodiments.

FIG. 4A is a cross-section view of a DPP structure 400 for digital tilt correction in a rest position, according to some embodiments. DPP structure 400 includes glass substrate 401, spacers 402a, 402b, membrane 403 and stiff plate 404. Spacers 402a, 402b, membrane 403 and glass substrate 401 form cavity 405 that is filled with oil or other suitable optical fluid. In this example, a square plate, membrane and glass substrate are shown. However, in other embodiments any suitable shaped plate, membrane or glass substrate can be used (e.g., circular shape). The oil is encapsulated in cavity 405 at constant volume. In some embodiments, piezo force actuation applies local attraction forces on stiff plate 404. In the example shown in FIG. 4B, plate tilt is induced by two piezo local forces applied onto the right corners of plate 404 and oil counter pressure to the local forces.

Figure 4C:
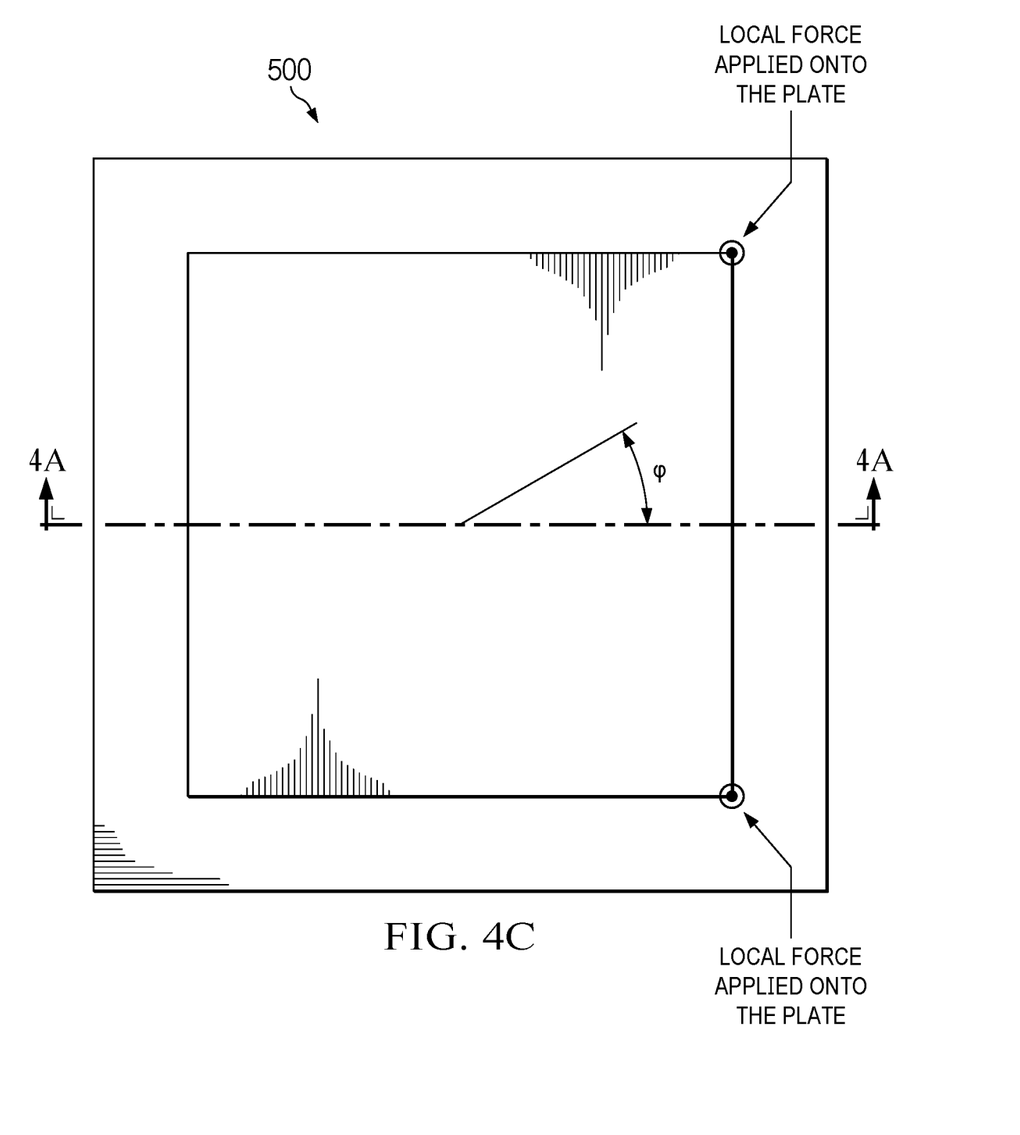
FIG. 4C is a top view of the DPP structure of FIG. 4A illustrating plate tilt induced by local forces and oil counter pressure, according to some embodiments.

FIG. 4C is a top view of DPP structure 400 under actuation showing a rotational angle φ due to the two local forces applied to the right corners of stiff plate 404. In other embodiments, local forces can be applied on top and bottom right corners of stiff plate 404 or any other suitable locations on stiff plate 504. In some embodiments, stiff plate 404 is made of glass (e.g., having 100 mu thickness) to avoid any deformation from the oil pressure, and membrane 502 is made of polysiloxane polymers. In some embodiments, two piezo actuators (e.g., piezo beams) can be used per corner of stiff plate 404. In some embodiments, electrostatic forces can be used in place of, or together with, the piezo forces to tilt the plate for tilt compensation.

In some embodiments, a first DPP structure 200 is used to perform aberration correction by deforming the shape of the membrane with bottom electrodes in the aperture area in accordance with a first Zernike target, and a second DPP structure 400 is used to perform tilt compensation using electrodes placed at two or more corners or edges of stiff plate 504. In some embodiments, a single DPP with patterned 33 electrodes can perform both tilt and aberration correction within constraints imposed by maximum peak-to-valley amplitude on the deformable membrane and maximum reachable Zernike order, e.g., up to 5th Zernike order.

In some embodiments, the image tilt can be compensated and image quality restored by introducing an additional wavefront tilt by placing DPP 200 or DPP 400 close to the image sensor 105 (see FIG. 1). In some embodiments, the architecture can be mechanically compact (z-neutral sizing) if DPP 200 or DPP 400 is placed in the existing location of an IR cut-off filter and implementing the IR filter directly on the lens element or other optical component in the optical assembly. In some embodiments, multiple DPP structures 200 or DPP 400 can be cascaded to provide larger wavefront control if needed. In some embodiments, DPP 200 can be used within the optical stack as a means to correct low-order wavefront aberrations including tip/tilt and jitter due to atmospheric turbulence or other environmental influences. In some embodiments, DPP 200 or DPP 400 is located in the entrance pupil of the camera lens.

Figure 5:
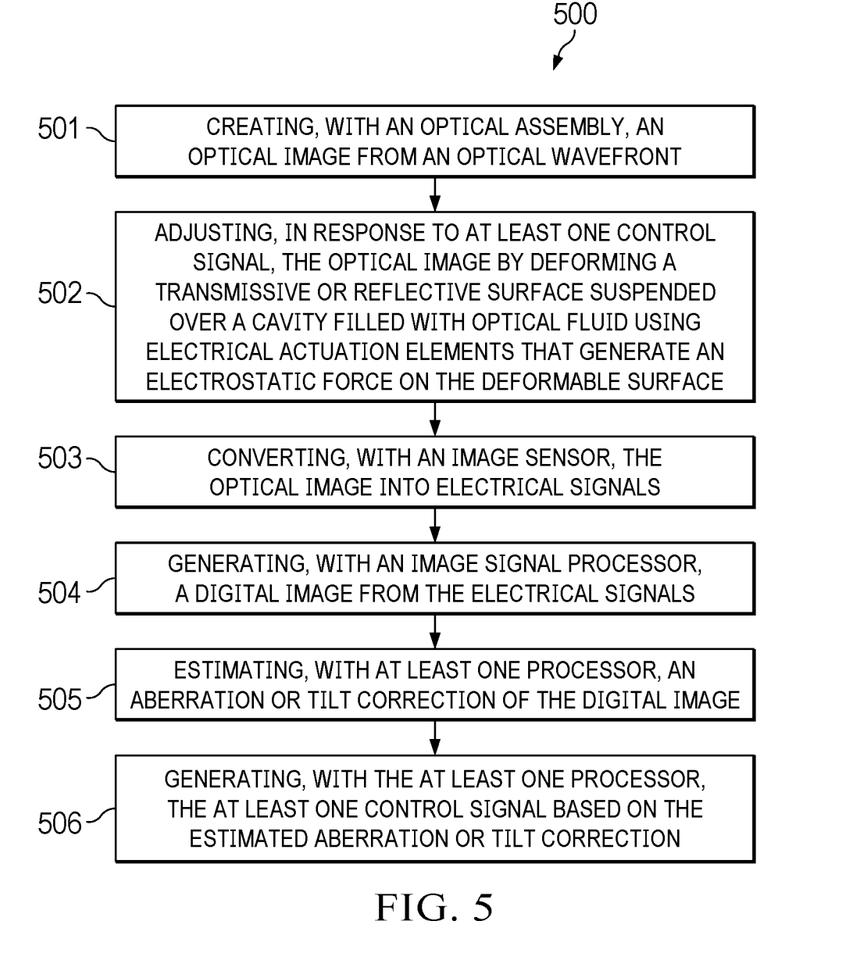
FIG. 5 is a flow diagram of a process of aberration or tilt correction using a DPP structure as described in reference to FIGS. 1-4.

FIG. 5 is a flow diagram of a process 500 of aberration or tilt correction using a camera system with the DPP structures described in reference to FIGS. 1-4.

Process 500 includes the steps of: creating, with an optical assembly, an optical image from an optical wavefront (501); adjusting, in response to at least one control signal, the optical image by deforming a transmissive or reflective surface suspended over a cavity filled with optical fluid using electrical actuation elements that generate an electrostatic force on the deformable surface (502); converting, with an image sensor, the optical image into electrical signals (503); generating, with an image signal processor, a digital image from the electrical signals (504); estimating, with at least one processor, at least one of an aberration or tilt correction of the digital image (505); and generating, with the at least one processor, the at least one control signal based on the at least one estimated aberration or tilt correction (506). These steps were previously described in detail in reference to FIGS. 1-4.

In some embodiments, the control and use procedure described above can be implemented in a single pass mode (feed forward) with set of precomputed correction signals. These correction signals can be derived using an optimization procedure for unknown signals using an image-based cost metric. Multiple methods and models are possible, ranging from a linear phase diversity model to a modal decomposition model where each individual Zernike mode is corrected one by one. In some embodiments, an iterative procedure is used to correct N free parameters (where N is equal to number of accessible modes) based on at least 2N+1 measurements (e.g. observed images for different settings of DPP control parameters).

In some embodiments, an image quality metric is used, e.g., a local and global focus metric or a local focus metric derived from a split-pixel architecture of the image sensor 105. Some of these image quality metrics may enable derivation of the control signals without using an iterative procedure or with significantly reduced computational load. In general, the procedure 400 may involve a feedback loop from an estimated image quality metric to a new set of computed control signals. This feedback loop may include a pretrained neural network as well.

An important aspect of the control system described herein is the possible use of precomputed static control signals and dynamic control signals computed in real-time during the operation of the camera system. One possible static control pattern can include signals precomputed to compensate known membrane shape deviations, e.g., caused by gravity influence. This gravity compensation can be done with a static set of compensating signals and their dynamic modification based on input from other sensors in the larger system, e.g., accelerometer data from an accelerometer to estimate direction and orientation of the deformable membrane in a gravitational field. In addition, an independent temperature sensor output can be used in conjunction with model-based precomputed control signals to control membrane shape at different environmental temperatures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A camera system comprising:
   an optical assembly to receive an optical wavefront and to create an optical image from the optical wavefront;
   at least one deformable phase plate (DPP) to receive the optical image from the optical assembly and to adjust the optical image in accordance with at least one control signal, the at least one DPP including a deformable surface suspended over a cavity filled with optical fluid, and electrical actuation elements configured to change a shape of the deformable surface based on the at least one control signal, the electrical actuation elements arranged in a pattern in the cavity and, when activated, providing an electrostatic force on the deformable surface;
   an image sensor to convert the adjusted optical image into electrical signals;
   an image signal processor to generate a digital image from the electrical signals; and
   an estimator to estimate an aberration or tilt correction of the digital image and to generate the at least one control signal based on the estimated aberration or tilt correction.

2. The camera system of claim 1, wherein the electrical actuation elements are arranged in a plurality of stages comprising concentric rings of electrical actuation elements, each ring having a different size and number of electrical actuation elements.

3. The camera system of claim 1, wherein the electrical actuation elements are located in an aperture area and the aperture area is separated from an edge of the cavity by a gap.

4. The camera system of claim 1, wherein the DPP includes piezo actuators added outside an optical area of the DPP for temperature compensation of optical fluid contraction or expansion.

5. The camera system of claim 2, wherein the number of electrical actuation elements is 33.

6. The camera system of claim 1, wherein the at least one DPP is in-line with the image sensor and the deformable surface is transmissive.

7. The camera system of claim 1, wherein the optical assembly creates a folded optical path and the deformable surface is reflective.

8. The camera system of claim 1, wherein the aberration or tilt correction of the digital image is estimated using a linearized phase diversity process that uses a plurality of digital images with various focus positions, and the at least one control signal is generated by minimizing at least one image quality metric or cost function.

9. The camera system of claim 8, wherein the plurality of digital images with various focus positions are obtained from an autofocus mechanism of the camera system with optical image stabilization.

10. The camera system of claim 1, wherein the aberration or tilt correction of the digital image is estimated using neural network trained to recognize the aberration or tilt correction from at least one image, and the at least one control signal is generated by the neural network.

11. The camera system of claim 10, wherein the image sensor has a split-pixel architecture and the aberration or tilt correction of the digital image is estimated using data obtained from the split-pixel architecture.

12. The camera system of claim 1, wherein the image sensor has a quad-pixel architecture and a sparse subset of image data from the quad-pixel architecture, and information on focus or other dependencies in quad-pixel data are calibrated against a set of compensating signals on the at least one DPP.

13. The camera system of claim 1, wherein there are at least two DPPs that are cascaded in an optical path of the camera system.

14. The camera system of claim 1, wherein the at least one DPP is located in the optical assembly.

15. The camera system of claim 1, wherein the optical fluid is oil.

16. The camera system of claim 1, wherein the deformable surface is an elastomer membrane comprising siloxane materials.

17. The camera system of claim 1, where an antireflection coating is added to the deformable surface.

18. The camera system of claim 1, wherein the electrical actuation elements are actuated by actuation voltages based on precomputed and stored influence elements and Zernike coefficients obtained during a calibration process.

19. A method comprising:
creating, with an optical assembly, an optical image from an optical wavefront;
adjusting, in response to at least one control signal, the optical image by deforming a transmissive or reflective surface suspended over a cavity filled with optical fluid using electrical actuation elements that generate an electrostatic force on the deformable surface;
converting, with an image sensor, the optical image into electrical signals;
generating, with an image signal processor, a digital image from the electrical signals;
estimating, with at least one processor, an aberration or tilt correction of the digital image; and
generating, with the at least one processor, the at least one control signal based on the estimated aberration or tilt correction.

20. The method of claim 19, wherein estimating the aberration or tilt correction of the digital image further comprises:
estimating the aberration or tilt correction using a linearized phase diversity process that uses a plurality of digital images with various focus positions; and
generating the at least one control signal by minimizing at least one image quality metric or cost function.

21. The method of claim 19, wherein estimating the aberration or tilt correction of the digital image comprises:
estimating the aberration or tilt correction using a neural network trained to recognize the aberration or tilt correction from at least one image; and
generating, by the neural network, the at least one control signal.

22. A camera system comprising:
an optical assembly to receive an optical wavefront and to create an optical image from the optical wavefront;
at least one deformable phase plate (DPP) to receive the optical image from the optical assembly and to adjust the optical image in accordance with at least one control signal, the at least one DPP including a transmissive plate with a transmissive membrane suspended over a cavity filled with optical fluid;
piezo actuators configured to apply forces to the plate in response to the at least one control signal, wherein the forces and counter pressure to local forces from the optical fluid causes the transmissive plate to tilt;
an image sensor to convert the adjusted optical image into electrical signals;
an image signal processor to generate a digital image from the electrical signals; and
an estimator to estimate a tilt correction of the digital image and to generate the at least one control signal based on the estimated tilt correction.

* * * * *